Oct. 16, 1923.

W. A. BARTLETT

TROLLEY

Filed March 1, 1923

1,471,135

Inventor.
William A. Bartlett,
By E. Salton Brewington,
Attorney.

Patented Oct. 16, 1923.

1,471,135

UNITED STATES PATENT OFFICE.

WILLIAM A. BARTLETT, OF BALTIMORE, MARYLAND.

TROLLEY.

Application filed March 1, 1923. Serial No. 622,013.

*To all whom it may concern:*

Be it known that I, WILLIAM A. BARTLETT, a citizen of the United States, residing at Baltimore city, State of Maryland, have invented certain new and useful Improvements in Trolleys, of which the following is a specification.

This invention relates to trolley wheels, and its object is to provide a novel and improved means for maintaining a constant rolling contact of the wheel with the wire, and thus prevent the wheel from accidentally leaving the wire.

The object stated is attained by means of a combination and arrangement of parts to be hereinafter described and claimed, and in order that the same may be better understood, reference is had to the accompanying drawing, wherein,—

Figure 1:
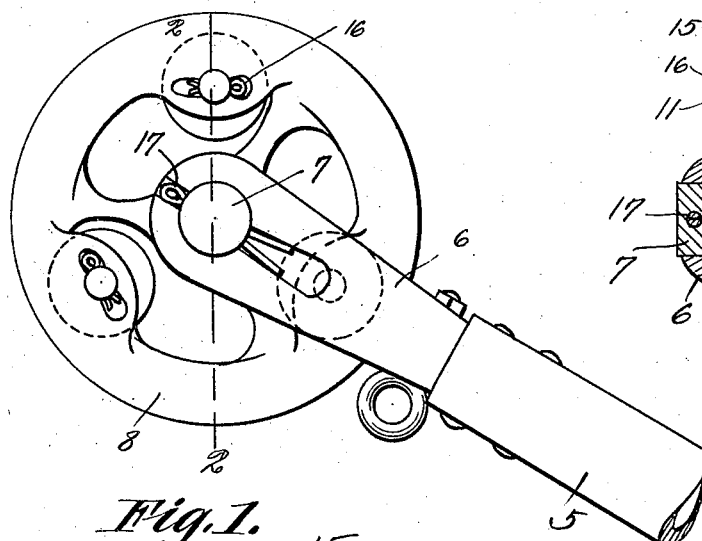
Figure 1 is an elevation of a trolley wheel showing the application of the invention thereto.
Figure 2:
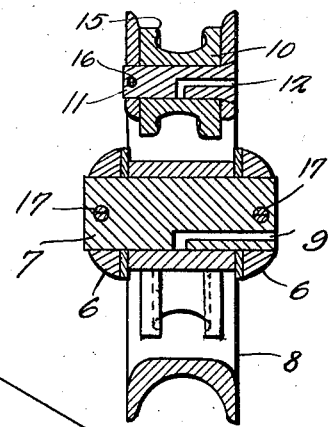
Fig. 2 is a section on the line 2—2 of Fig. 1.
Figure 3:
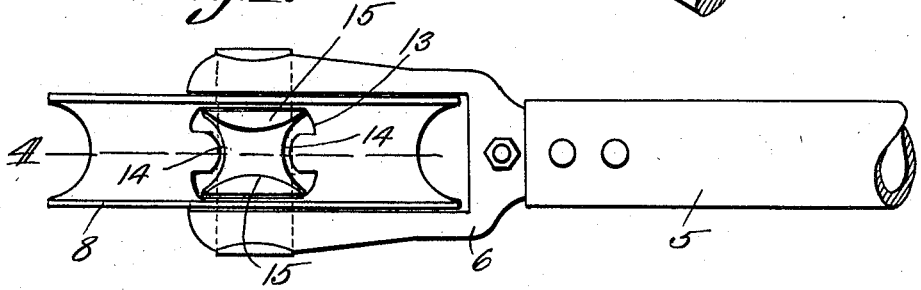
Fig. 3 is a plan view.

Referring specifically to the drawing, 5 denotes the outer end of a trolley pole equipped with a fork 6 carrying the axle 7 on which the trolley wheel 8 is journalled. The axle 7 has an oil duct 9 leading from one end thereof and terminating at the side, so as to carry oil to the hub of the trolley wheel.

The trolley wheel 8 has a grooved periphery as usual, and into the groove extend guard rollers 10 for preventing the wheel from accidentally leaving the wire. Three equidistantly spaced rollers are provided, and each roller is mounted to rotate freely on a stationary shaft 11 carried by the trolley wheel and having an oil duct 12 extending from one end to the side, so as to carry oil to the hub of the roller.

Figure 4:
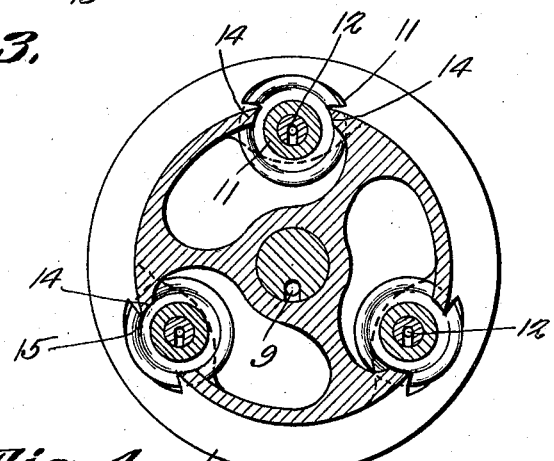
Fig. 4 is a cross-section on the line 4—4 of Fig. 3.

In order to apply the rollers 10 to the trolley wheel 8, the latter has its periphery formed with recesses 13 across which the shafts 11 extend, and in which recesses the rollers are located. The rollers have a grooved periphery, and they are so positioned that their grooves, at the bottom, coincide with the bottom of the trolley wheel groove, as clearly shown in Fig. 4. Thus, the wire, when not in contact with the bottom of the trolley wheel groove, is in contact with the bottom of the groove of the roller which happens to be at the top of the trolley wheel. To avoid gaps between the rollers and the bottom of the trolley wheel groove, the latter extends into the grooves of the rollers on opposite sides thereof as shown at 14.

Each roller 10 has the side walls of its groove thickened at diametrically opposite points in such a way that the groove is here reduced in width and the said thickened portions are also formed with slightly overhanging side walls, as shown at 15.

The roller shafts 11 are held stationary by cotter pins 16, and similar means 17 are provided for holding the trolley wheel axle 7 stationary.

When the wheel 8 is traveling along the trolley wire, it rotates, and hence the rollers 11, one after the other and singly, arrive at the top to come into contact with the wire, whereupon they also are made to rotate. If the wheel shows any tendency to jump the wire the overhanging sides 15 of the roller groove will at once, by the rotary motion of the roller, crowd the wire back to its proper position in the middle of the groove, and the continued contact of the wheel with the wire is thus assured. Owing to the great speed at which the wheel rotates, the rollers come into operative position, one after the other, so rapidly, that the time intervals between such positions are too short to permit the wheel to leave the wire, or the wire to slip off the wheel. The guard rollers therefore effectually serve the purpose for which they have been designed, and at the same time they do not interfere with the removal of the trolley wheel from the wire when the trolley pole is swung down for this purpose.

I claim:

1. The combination with a trolley-wheel having a grooved periphery; of a plurality of guard rollers carried by said wheel and journaled transversely of its groove, said rollers having grooved peripheries and the bottom of the roller grooves coinciding with the bottom of the trolley-wheel groove, the side walls of the roller grooves having portions which overhang said grooves.

2. The combination with a trolley-wheel having a grooved periphery; of a plurality of guard rollers carried by said wheel and journaled transversely of its groove, said rollers having grooved peripheries and the side walls of the roller grooves having portions which overhang said grooves.

3. The combination with a trolley-wheel having a grooved periphery; of a plurality of guard rollers carried by said wheel and adapted to come into contact with the trolley wire one after the other and singly, said rollers having grooved peripheries, and said roller grooves having portions which are reduced in width.

4. The combination with a trolley-wheel having a grooved periphery; of a plurality of guard rollers carried by said wheel and adapted to come into contact with the trolley wire one after the other and singly, said rollers having grooved peripheries, and the bottom of the roller grooves coinciding with the bottom of the trolley wheel groove, said roller grooves having portions which are reduced in width.

5. The combination with a trolley-wheel having a grooved periphery; of a plurality of guard rollers carried by said wheel and adapted to come into contact with the trolley wire one after the other and singly, said rollers having grooved peripheries, and the bottom of the roller grooves coinciding with the bottom of the trolley-wheel groove, the side walls of the roller grooves having portions which overhang said grooves.

6. The combination with a trolley-wheel having a grooved periphery; of a plurality of guard rollers carried by said wheel and journaled transversely of its groove, said rollers having grooved peripheries and the bottom of the roller grooves coinciding with the bottom of the trolley-wheel groove, said roller grooves having portions which are reduced in width.

7. The combination with a trolley-wheel having a grooved periphery; of a plurality of guard rollers carried by said wheel and journaled transversely of its groove, said rollers having grooved peripheries, and said roller grooves having portions which are reduced in width.

In testimony whereof I affix my signature.

WILLIAM A. BARTLETT.